United States Patent
Shin et al.

(10) Patent No.: US 8,477,790 B2
(45) Date of Patent: Jul. 2, 2013

(54) APPARATUS AND METHOD FOR OPERATING RELAY LINK IN RELAY BROADBAND WIRELESS COMMUNICATION SYSTEM

(75) Inventors: Oh-Soon Shin, Seoul (KR); Sang-Boh Yun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1485 days.

(21) Appl. No.: 12/077,815

(22) Filed: Mar. 21, 2008

(65) Prior Publication Data
US 2008/0232296 A1   Sep. 25, 2008

(30) Foreign Application Priority Data
Mar. 21, 2007   (KR) .................. 10-2007-0027716

(51) Int. Cl.
*H04L 12/28*   (2006.01)
(52) U.S. Cl.
USPC ............................ 370/400; 455/524; 455/525
(58) Field of Classification Search
USPC ..................... 370/315, 400; 455/524, 525
See application file for complete search history.

(56) References Cited

U.S. PATENT DOCUMENTS

| | | | | |
|---|---|---|---|---|
| 5,499,395 | A * | 3/1996 | Doi et al. | 455/422.1 |
| 6,473,617 | B1 * | 10/2002 | Larsen et al. | 455/446 |
| 2002/0191558 | A1 * | 12/2002 | Agrawal et al. | 370/329 |
| 2007/0081448 | A1 * | 4/2007 | Ahmed et al. | 370/203 |
| 2007/0217433 | A1 * | 9/2007 | Doppler et al. | 370/400 |
| 2008/0171551 | A1 * | 7/2008 | Zhu et al. | 455/450 |

FOREIGN PATENT DOCUMENTS

| | | |
|---|---|---|
| KR | 1020000059962 A | 10/2000 |
| KR | 1020030009193 A | 1/2003 |
| KR | 1020060084755 A | 7/2006 |

* cited by examiner

*Primary Examiner* — Sai-Ming Chan

(57) ABSTRACT

Provided is a relay broadband wireless communication system. The relay broadband wireless communication system includes a plurality of base stations, and one or more relay stations. The base stations perform communication with a relay station placed within a coverage area and generate state information to be provided to the relay station. The one or more relay stations are disposed at a location allowing communication with the plurality of base stations and select one or more serving base stations based on state information received from each of the base stations.

26 Claims, 11 Drawing Sheets

APPARATUS AND METHOD FOR OPERATING RELAY LINK IN RELAY BROADBAND WIRELESS COMMUNICATION SYSTEM

CROSS-REFERENCE TO RELATED APPLICATION(S) AND CLAIM OF PRIORITY

The present application claims priority under 35 U.S.C. §119 (a) to an application filed in the Korean Intellectual Property Office on Mar. 21, 2007 and allocated Serial No. 2007-27716, the contents of which are incorporated herein by reference.

TECHNICAL FIELD OF THE INVENTION

The present invention relates generally to a relay broadband wireless communication system, and in particular, to an apparatus and method for operating a relay link in a relay broadband wireless communication system.

BACKGROUND OF THE INVENTION

Multi-hop relaying is drawing much attention as a technology that can expand cell coverage at a low cost in a cellular system and provide users with high transmission rate. Representatively, IEEE 802.16j relay task group is standardizing mobile multihop relay (MMR), and developed laboratories and enterprises studying $4^{th}$ generation (4G) mobile communications around the world are competitively developing the multi-hop relaying technology.

For the multi-hope relaying, one or more relay stations that relay data between a base station (BS) and a mobile station (MS) are needed. In the cellular system, a relay station (RS) may be a separate device separated from a BS and an MS, or the MS may serve as an RS for another MS. The RS reduces path loss by relaying data between a BS and an MS, thereby enabling high-speed data communication. Also, because the RS transmits a signal even to a distant MS or an MS in a shadow area, the cell coverage can be expanded. In other words, as the RS is disposed in the system as illustrated in FIG. 1A, a transmission rate can be improved at a cell shadow area and a cell boundary. Also, as the RS is disposed in the system as illustrated in FIG. 1B, the coverage can be expanded.

FIGS. 2A and 2B illustrate the use of radio resources in both cases of direct transmission and transmission using N-1 relay stations, and in FIGS. 2A and 2B, hops are divided on a time-division basis. FIG. 2B illustrates an example of the use of radio resources in a general relay broadband wireless communication system. When a signal is transmitted from a base station (BS) to a mobile station (MS) by using the relay station (RS), consumption of radio resources occurs as illustrated in FIG. 2B. As shown in FIGS. 2A and 2B, when data of one unit is transmitted over N hops, the transmission time that is N times longer than the direct-transmission time is required, that is, system resources are consumed N times more than in the direct transmission.

In the cell configuration illustrated in FIGS. 1A and 1B, each RS receives data from a specific BS, and the received data is transmitted to mobile stations within RS coverage. The RS cannot perform simultaneous transmission and reception using the same frequency. Thus, different frequencies or time resources must be allocated to a link between the BS and the RS and a link between the RS and the MS. The radio resources being consumed in communication between the BS and the RS act as a huge overhead, thereby reducing the amount of usable resources in communication between the BS and other mobile stations.

A plurality of relay stations fail to provide smooth services if sufficient resources are not ensured in the link between the BS and the RS and the link between the relay stations. Also, an increase in system capacity cannot be expected because of the overhead caused by resource consumption of the plurality of relay stations. Furthermore, to allow the relay service in a wide area, a large number of relay stations per BS are needed in the cell configuration of FIGS. 1A and 1B. Thus, the RS installation cost increases.

SUMMARY OF THE INVENTION

To address the above-discussed deficiencies of the prior art, it is a primary of the present invention is to substantially solve at least the above problems and/or disadvantages and to provide at least the advantages below. Accordingly, an object of the present invention is to provide an apparatus and method for reducing a resource overhead caused by relay communication in a relay broadband wireless communication system.

Another object of the present invention is to provide an apparatus and method for reducing the number of relay stations required for relay communication in a relay broadband wireless communication system.

Another object of the present invention is to provide an apparatus and method for causing a radio station to selectively connect to a plurality of base stations in a relay broadband wireless communication system.

According to one aspect of the present invention, a relay broadband wireless communication system includes: a plurality of base stations performing communication with a relay station placed within a coverage area and generating state information to be provided to the relay station; and one or more relay stations disposed at a location communicable with the plurality of base stations and selecting one or more serving base stations based on state information received from each of the base stations.

According to another aspect of the present invention, a relay station apparatus in a relay broadband wireless communication system includes: a management unit storing state information of a plurality of base stations that are communicable; a selection unit selecting one or more serving base stations based on the state information; and a communication unit transmitting/receiving a signal with the one or more serving base stations.

According to another aspect of the present invention, a base station apparatus in a relay broadband wireless communication system includes: a generation unit generating state information of a base station to select a serving base station of a relay station shared by a plurality of base stations; a communication unit transmitting the state information to the relay station; and a control unit determining whether to accept connection when a connection request is generated from the relay station.

According to another aspect of the present invention, a method for operating a relay station in a relay broadband wireless communication system includes: receiving state information of a plurality of base stations being communicable; selecting one or more serving base stations based on the state information; and performing communication with the one or more serving base stations.

According to another aspect of the present invention, a method for operating a base station in a relay broadband wireless communication system includes: transmitting state information of the base station to a relay station shared by a plurality of base stations to cause the relay station to select a serving base station; determining whether to accept connection when a connection request is generated from the relay station; and performing communication with the relay station when the connection is accepted.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A technique for causing a relay station (RS) to select a serving base station (BS) in a relay broadband wireless communication system according to the present invention will be described. An orthogonal frequency division multiplexing (OFDM) wireless communication system is described as an example in the following description. However, the present invention is not limited thereto but is applicable to other types of wireless communication systems in the same manner.

The cell configuration proposed according to the present invention will now be briefly described.

Figure 1A:
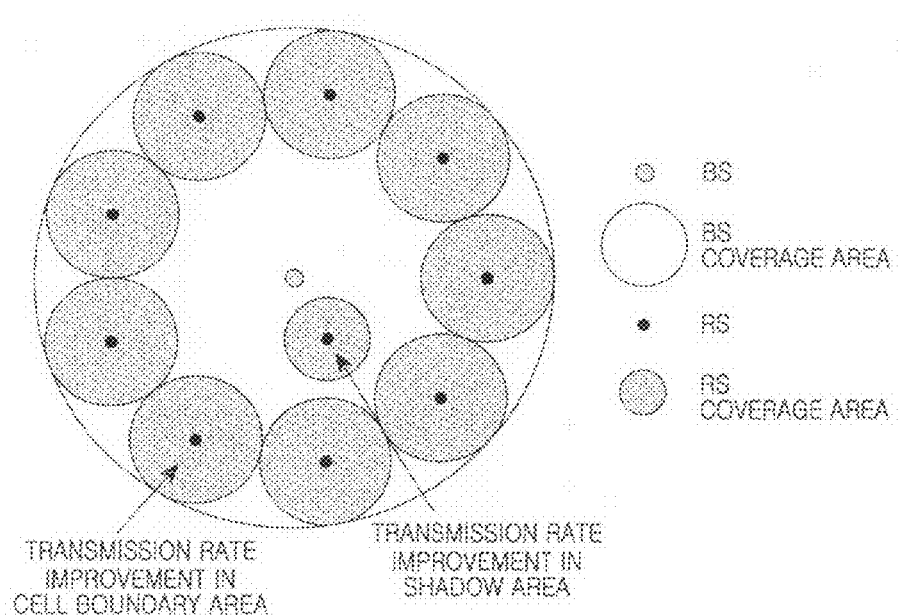
FIGS. 1A and 1B illustrate cell configuration in a general relay broadband wireless communication system.
Figure 1B:
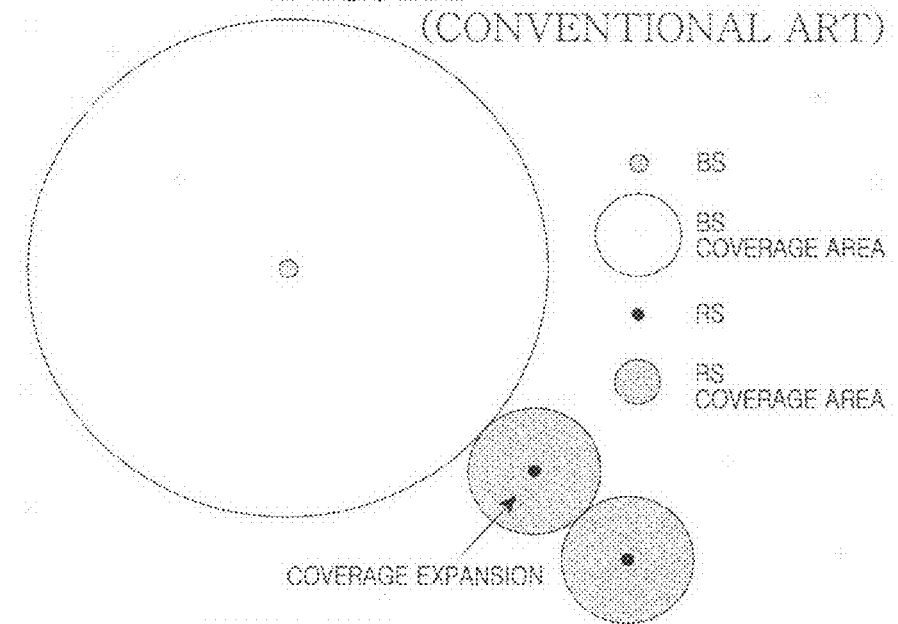
Figure 2A:
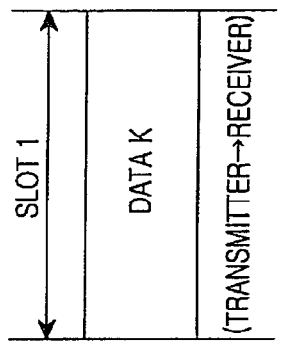
FIGS. 2A and 2B illustrate the use of radio resources in direct transmission and in a general relay broadband wireless communication system, respectively.
Figure 2B:
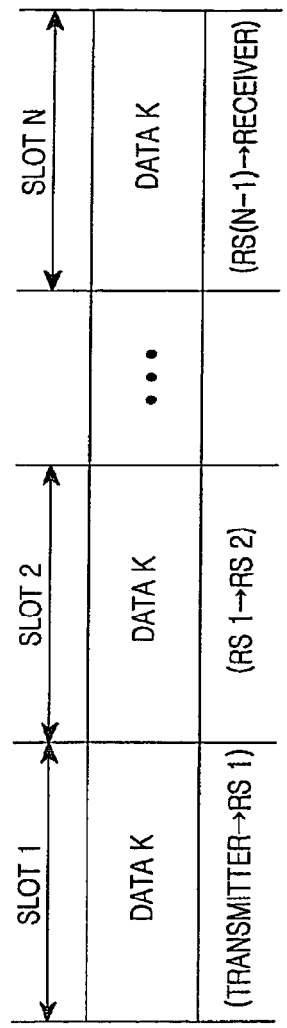
Figure 3:
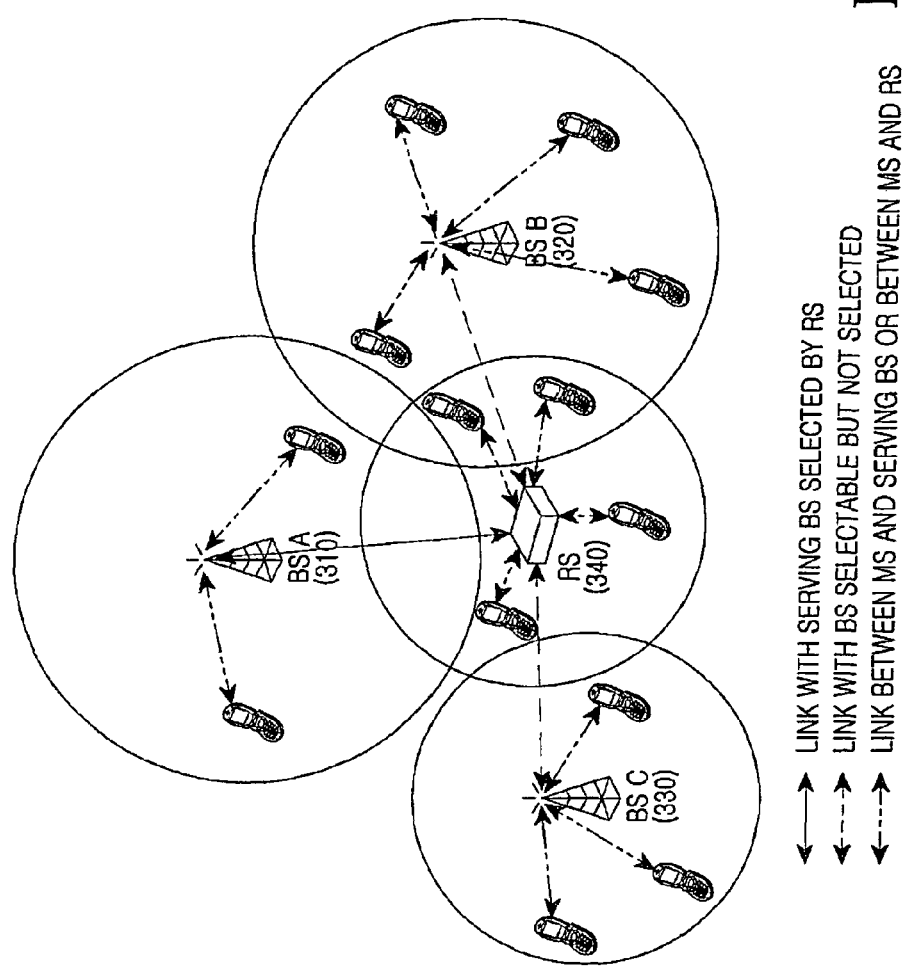
FIG. 3 illustrates link configuration of a BS and an RS in a relay broadband wireless communication system according to the present invention.

FIG. 3 illustrates an example of link configuration of a base station (BS) and a relay station (RS) in a relay broadband wireless communication system according to the present invention.

Referring to FIG. 3, BS A 310, BS B 320 and BS C 330 are adjacent to each other, and perform communication with mobile stations placed in their respective cells. An RS 340 is disposed at a location allowing communication with all of the base stations A, B and C 310, 320 and 330. Thus, the RS 340 may perform relay communication with at least one of the BS A 310, the BS B 320 and the BS C 330. Since the plurality of base stations share one RS, the number of relay stations necessary for relay communication is reduced.

If a relay link is configured as illustrated in FIG. 3 the RS 340 must select a serving BS for relay communication. The RS 340 selects the serving BS by referencing a channel state with each BS, and load information of each BS. The channel state may be measured directly by the RS 340 by using a preamble signal or a pilot signal transmitted from each BS. The load information may be received from each BS through a kind of control channel.

Figure 4A:
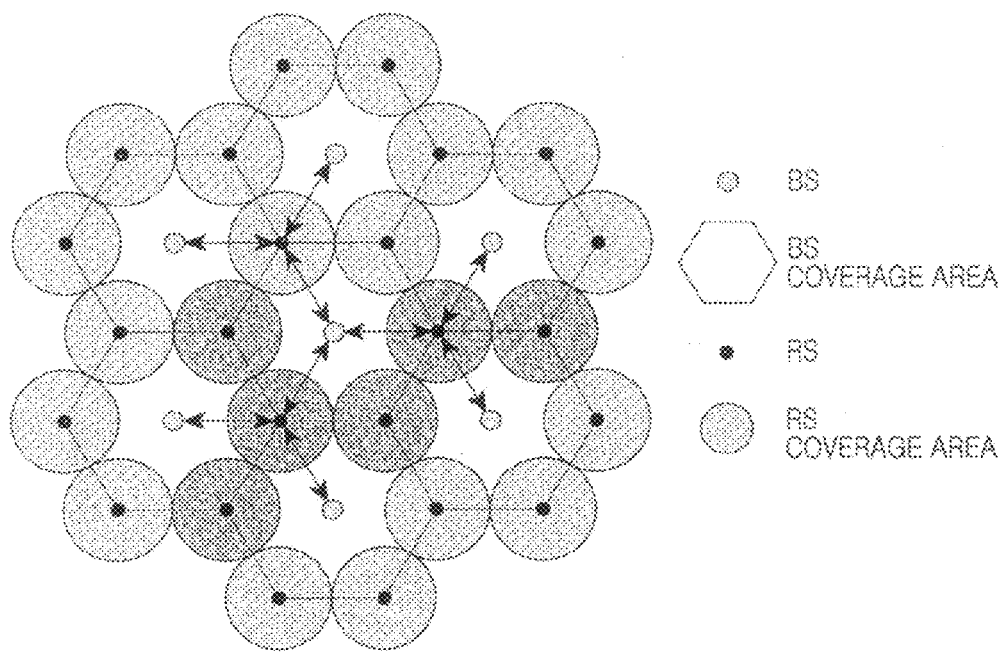
FIG. 4A illustrates a first example of RS disposition in a relay broadband wireless communication system according to the present invention.
Figure 4B:
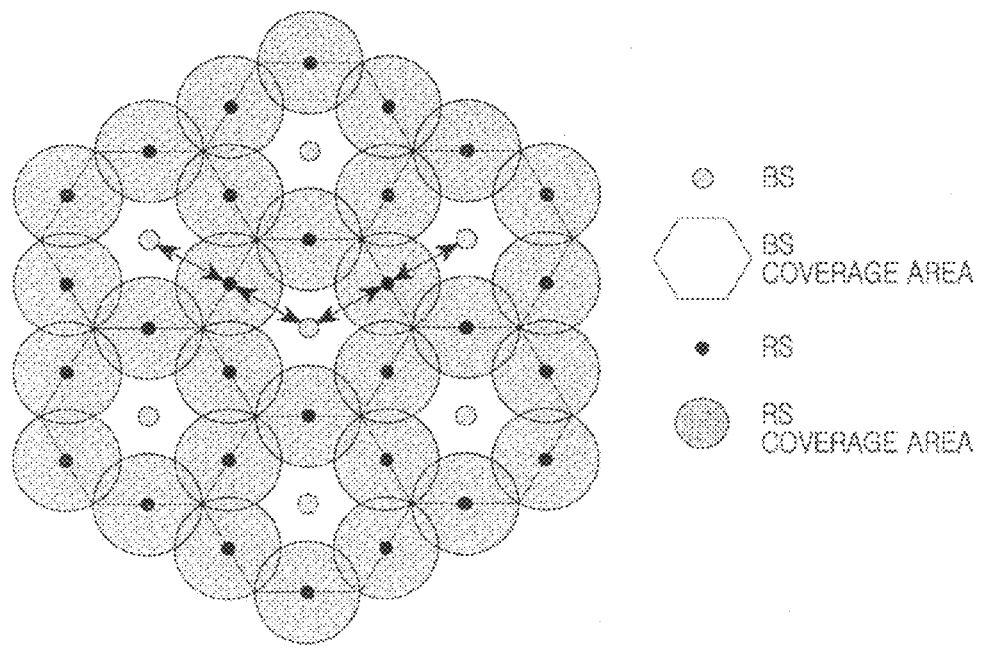
FIG. 4B illustrates a second example of RS disposition in a relay broadband wireless communication system according to the present invention.
Figure 4C:
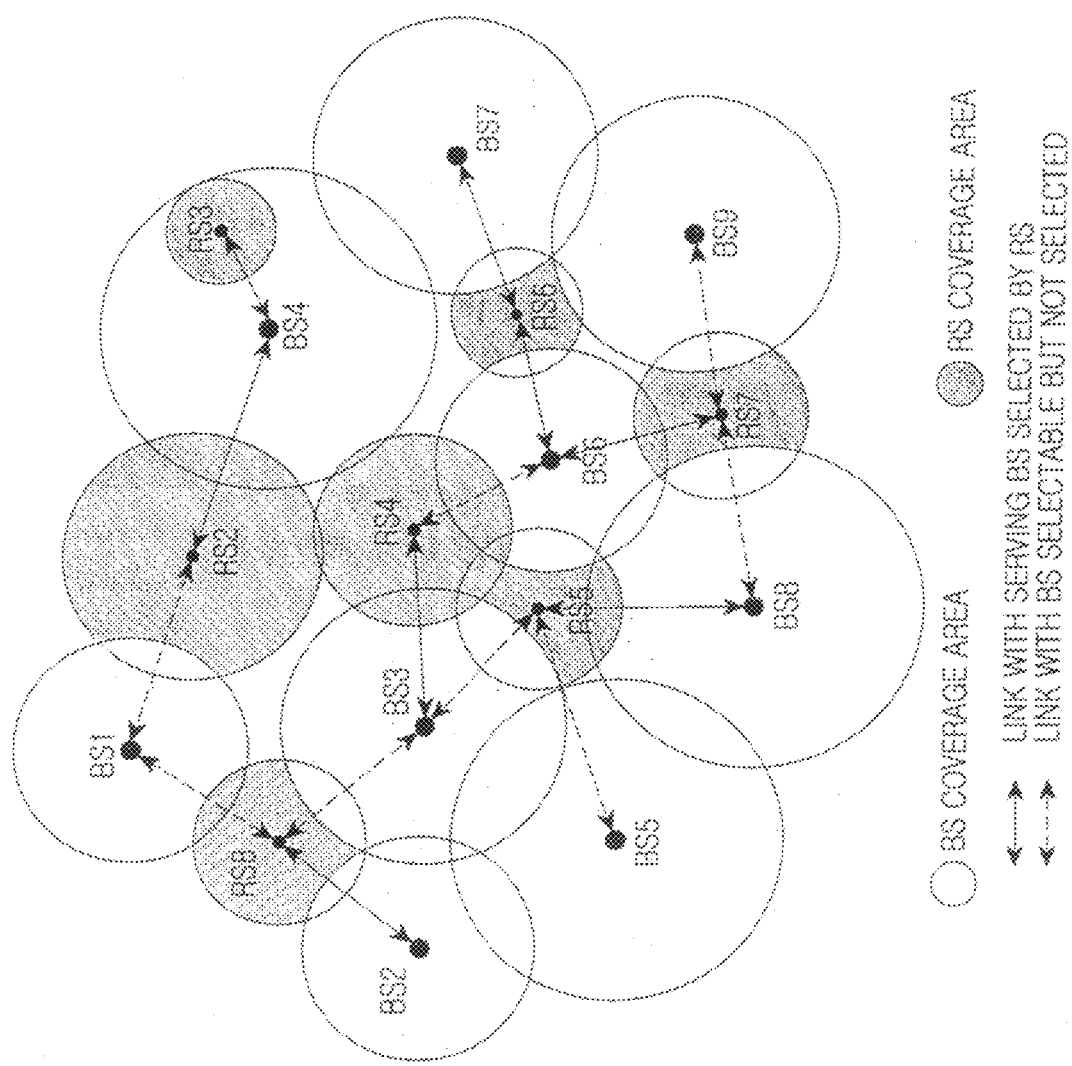
FIG. 4C illustrates a third example of RS disposition in a relay broadband wireless communication system according to the present invention.

Specific examples of relay-station disposition are illustrated in FIGS. 4A through 4C. FIG. 4A illustrates the case where three base stations share one RS, and FIG. 4B illustrate the case where two base stations share one RS. FIG. 4C illustrates the RS disposition in the case where cell sizes have no regularity and coverage areas of the relay stations are not constant. In FIG. 4A, each RS has three serving BS candidates. In FIG. 4B, each RS has two serving BS candidates. In FIG. 4C, each RS has a different number of serving BS candidates according to surroundings. For example, in FIG. 4C, RS 1 has serving BS candidates of BS 1, BS 2 and BS 3, and RS 2 has serving BS candidates of BS 1 and BS 4. Also, there may be an RS that can select only one BS as its serving BS like RS 3 in FIG. 4C.

Figure 5A:
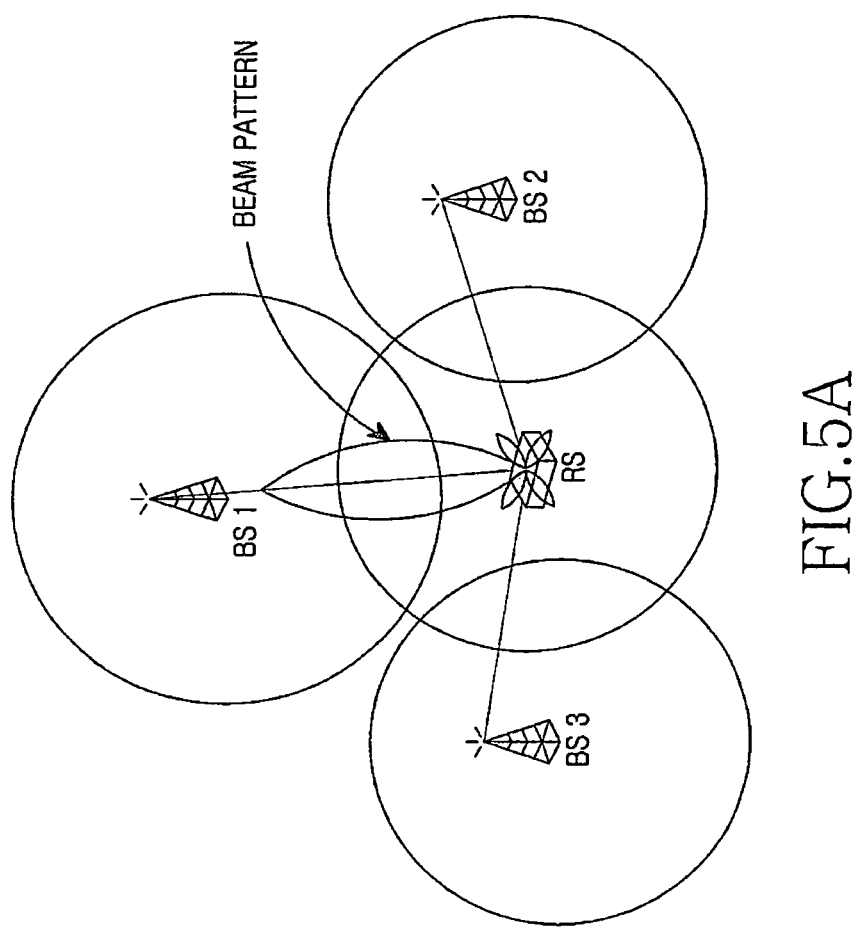
FIG. 5A illustrates a first example of a signal processing method of a relay link in a relay broadband wireless communication system according to the present invention.

The structure in which a plurality of base stations share one RS according to the present invention may cause a signal from a BS unselected by the RS to act as an interference signal in the RS. In this case, as illustrated in FIG. 5A, the RS may perform beamstirring or beamforming so that interference from the unselected BS can be reduced. Referring to FIG. 5A, the RS is performing communication with the BS 1 selected as a serving BS. The RS forms a main beam in the direction of the BS 1 by using a plurality of antennas, and forms a null in the directions of the BS 2 and the BS 3. Thus, the RS increases a gain of a signal transmitted/received to/from the BS 1, and attenuates mutual interference with the BS 2 and the BS 3.

If locations of the RS and the plurality of base stations are fixed, the RS performs beamforming on each station by using a fixed beam pattern. That is, the RS performs beamforming differently on surrounding base stations in due consideration of its surroundings.

Figure 5B:
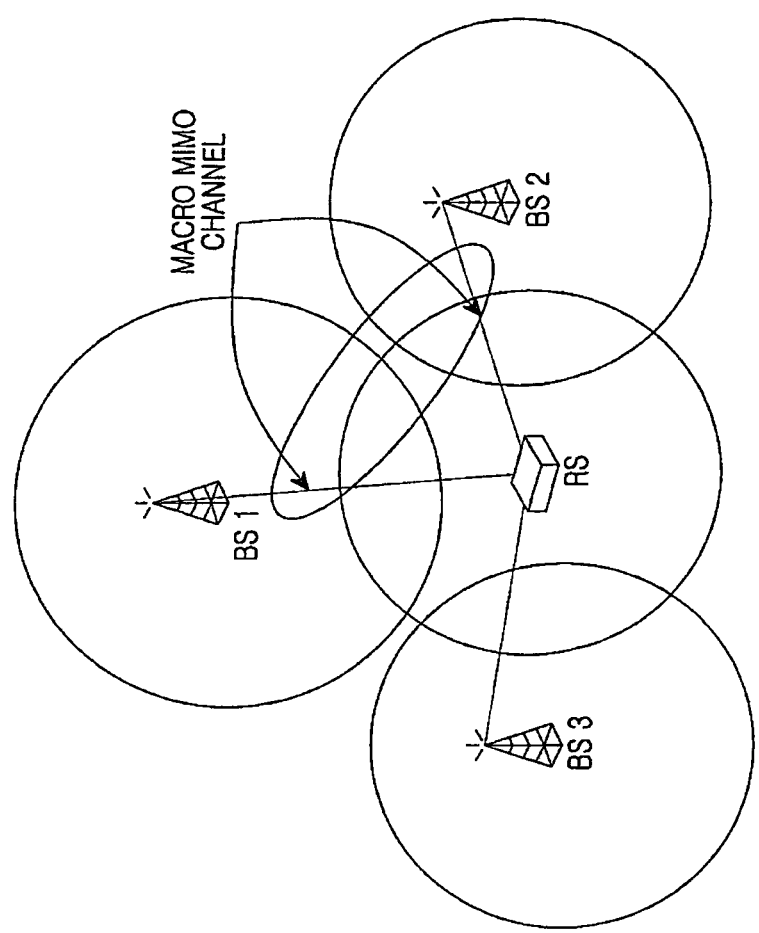
FIG. 5B illustrates a second example of a signal processing method of a relay link in a relay broadband wireless communication system according to the present invention.

The structure in which a plurality of base stations share one RS according to the present invention may cause the plurality of base stations to configure a macro multiple input multiple output (MIMO) environment as illustrated in FIG. 5B. Referring to FIG. 5B, the RS are performing communication with BS 1 and BS 2 selected as serving base stations. Because the BS 1 and the BS 2 form a macro MIMO channel with the RS, a space diversity technique such as a space-time code (STC) or a spatial multiplexing technique such as V-BLAST is applied in communication.

A system according to the present invention can be operated, employing the beamforming technique of FIG. 5A, the macro MIMO technique of FIG. 5B or a combination thereof.

Hereinafter, the configuration and operation procedures of an RS and a BS for performing relay communication in the above-described manner according to the present invention will now be described.

Figure 6:
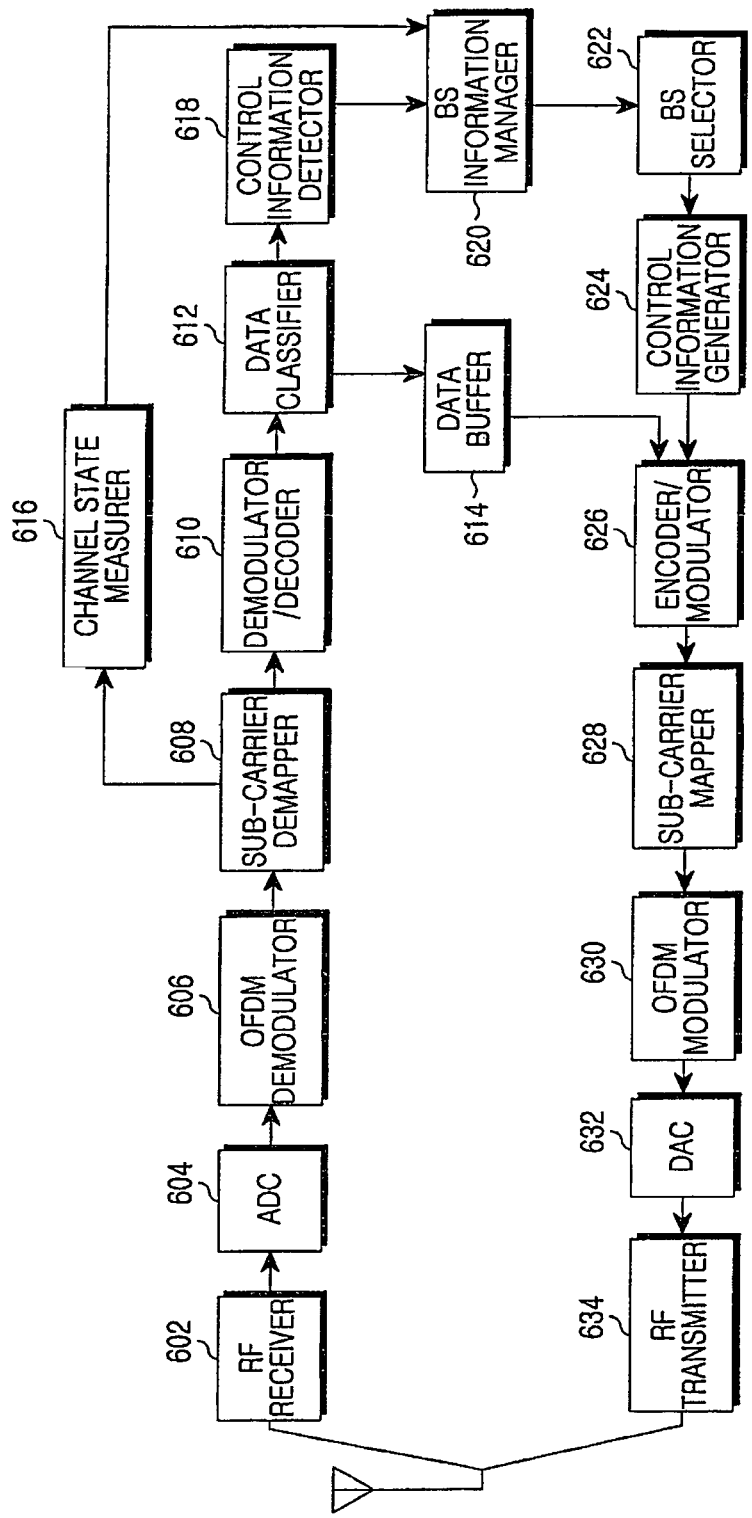
FIG. 6 is a block diagram of an RS in a relay broadband wireless communication system according to an embodiment of the present invention.

FIG. 6 is a block diagram of an RS in a relay broadband wireless communication system according to an embodiment of the present invention.

As illustrated in FIG. 6, the RS includes a radio frequency (RF) receiver 602, an analog-to-digital converter (ADC) 604, an OFDM demodulator 606, a sub-carrier demapper 608, a demodulator/decoder 610, a data classifier 612, a data buffer 614, a channel state measurer 616, a control information detector 618, a BS information manager 620, a BS selector 622, a control information generator 624, an encoder/modulator 626, a sub-carrier mapper 628, an OFDM modulator 630, a digital-to-analog converter (DAC) 632 and an RF transmitter 634.

The RF receiver 602 converts an RF signal received through an antenna into a baseband signal. The ADC 604 converts an analog signal provided from the RF receiver 602 into a digital signal. The OFDM demodulator 606 converts time-domain OFDM symbols provided from the ADC 604 into sub-carrier signals through fast fourier transform (FFT). The sub-carrier demapper 608 extracts signals mapped to allocated sub-carriers among the sub-carrier signals provided from the OFDM demodulator 606. The sub-carrier demapper 508 extracts a preamble and pilot signal to output the extracted signal to the channel state measurer 616, and extracts a traffic and control signal to output the extracted signal to the demodulator/decoder 610. The demodulator/decoder 610 demodulates and decodes signals provided from the sub-carrier demappers 608 into information bit strings.

The data classifier 612 classifies the information bit strings provided from the demodulator/decoder 610 into control information and traffic data. The control information is output to the control information detector 618, and the traffic data is output to the data buffer 614. The data buffer 614 stores the received traffic data for relay communication and outputs the traffic data at the time of transmission. The control information detector 618 detects the received control information to perform communication with a BS, an MS or the other RS. Particularly, according to the present invention, the control information detector 618 detects load information received from each BS. The load information is one that is used in selecting a serving BS of the RS, and periodically or non-periodically received from each BS.

The BS information manager 620 receives the load information of each BS from the control information detector 618, and receives channel state information with each BS from the channel state measurer 616. The BS information manager 620 stores and manages the received information. The BS selector 622 selects a serving BS based on the channel state and the load information of each BS, which are stored in the BS information manager 620. At this time, one or more base stations may be selected. In other words, the BS selector 622 selects a serving BS in due consideration of the load state of each BS, i.e., an absolute or relative amount of available resources of each BS, the channel state with each BS, and the required amount of resources. The control information generator 624 generates control information to be transmitted for communication with a BS, an MS or the other RS. Particularly, the control information generator 624 generates a control message for connection to the serving BS selected by the BS selector 622.

The encoder/modulator 626 encodes and modulates the information bit strings provided from the data buffer 614 and the control information generator 624 into signals. The sub-carrier mapper 628 maps the signals provided from the encoder/modulator 626 to an allocated sub-carrier resource. The OFDM modulator 630 converts sub-carrier signals provided from the sub-carrier mapper 628 into time-domain OFDM symbols through inverse fast fourier transform (IFFT). The DAC 632 converts a digital signal provided from the OFDM modulator 630 into an analog signal. The RF transmitter 634 converts a baseband signal provided from the DAC 623 into an RF signal and transmits the signal via an antenna.

In the block diagram of the RS illustrated in FIG. 6, only one Tx/Rx antenna and only one Tx/Rx path are illustrated for the convenience of description. According to the other embodiment of the present invention, the RS may include a plurality of Tx/Rx antennas and a plurality of Tx/Rx paths. In this case, to perform communication as shown in FIG. 5A, the RS further includes a beamformer that processes a signal transmitted/received through each path for beamforming or beamstirring. Alternatively, to perform communication as shown in FIG. 5B, the RS further includes an MIMO signal processor that processes a signal according to an MIMO technique, which is transmitted through a macro MIMO channel formed with channels of a plurality of base stations.

Figure 7:
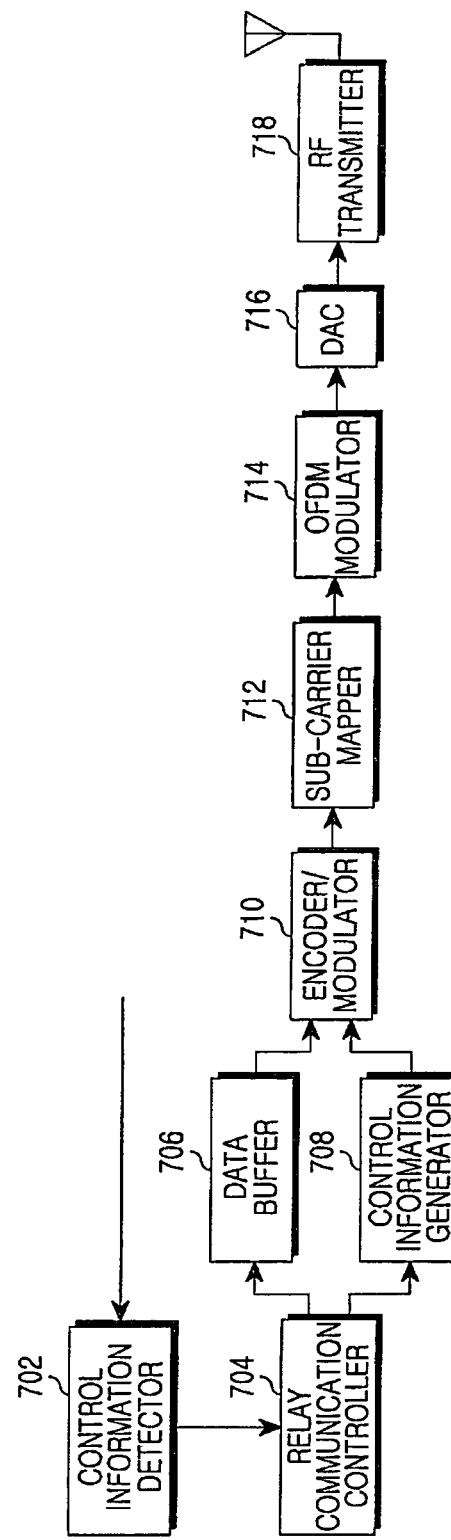
FIG. 7 is a block diagram of a BS in a relay broadband wireless communication system according to an embodiment of the present invention.

FIG. 7 is a block diagram of a BS in a relay broadband wireless communication system according to an embodiment of the present invention.

As shown in FIG. 7, the BS includes a control information detector 702, a relay communication controller 704, a data buffer 706, a control information generator 708, an encoder/modulator 710, a sub-carrier mapper 712, an OFDM modulator 714, a DAC 716 and an RF transmitter 718.

The control information detector 702 detects control information received from an RS. Particularly, according to the present invention, the control information detector 702 detects a control message that an RS transmits for connection. The relay communication controller 704 provides control for communication with the RS. In other words, the relay communication controller 704 references available resources, a load state, and so on to determine whether it can accept the RS that is requesting connection. Then, the relay communication controller 705 controls a connection procedure or a connection-deny procedure according to the determination result. Also, when the RS in communication sends a disconnection request, the relay communication controller 704 controls a procedure for disconnection. The relay communication controller 704 provides control to periodically or non-periodically send load information necessary for the RS to select a serving BS, and a preamble or pilot signal for measuring a channel state. The relay communication controller 704 provides control to form a macro MIMO channel with an RS selecting a plurality of base stations as serving base stations to perform communication. The control for forming the macro MIMO channel may be performed by coordination of an upper node of the BS or through signaling between base stations. The control for forming the MIMO channel includes, determination of base stations that are to participate in the MIMI channel formation, stream distribution between base stations forming the MIMO channel, and so on.

The data buffer 706 stores traffic data to be transmitted to an MS or an RS, and outputs the traffic data that is to be transmitted to the RS, under the control of the relay communication controller 704. The control information generator 708 generates control information to transmit for communication with an MS or an RS. Particularly, according to the present invention, when an RS requests connection, the control information generator 708 generates a control message corresponding to the determination of the relay communication controller 704. For example, the control information generator 708 generates a message including load information to be transmitted to the RS, a message for controlling connection and disconnection of the RS, and a message for controlling formation of a macro MIMO channel with the other BS.

The encoder/modulator 710 encodes and modulates information bit strings provided from the data buffer 706 and the control information generator 708 into signals. The sub-carrier mapper 712 maps the signals provided from the encoder/modulator 710 to a corresponding sub-carrier resource. The OFDM modulator 714 converts sub-carrier signals provided from the sub-carrier mapper 712 into time-domain OFDM symbols through IFFT. The DAC 716 converts a digital signal provided from the OFDM modulator 714 into an analog signal. The RF transmitter 718 converts a baseband signal provided from the DAC 716 into an RF signal, and transmits the RF signal via an antenna.

Figure 8:
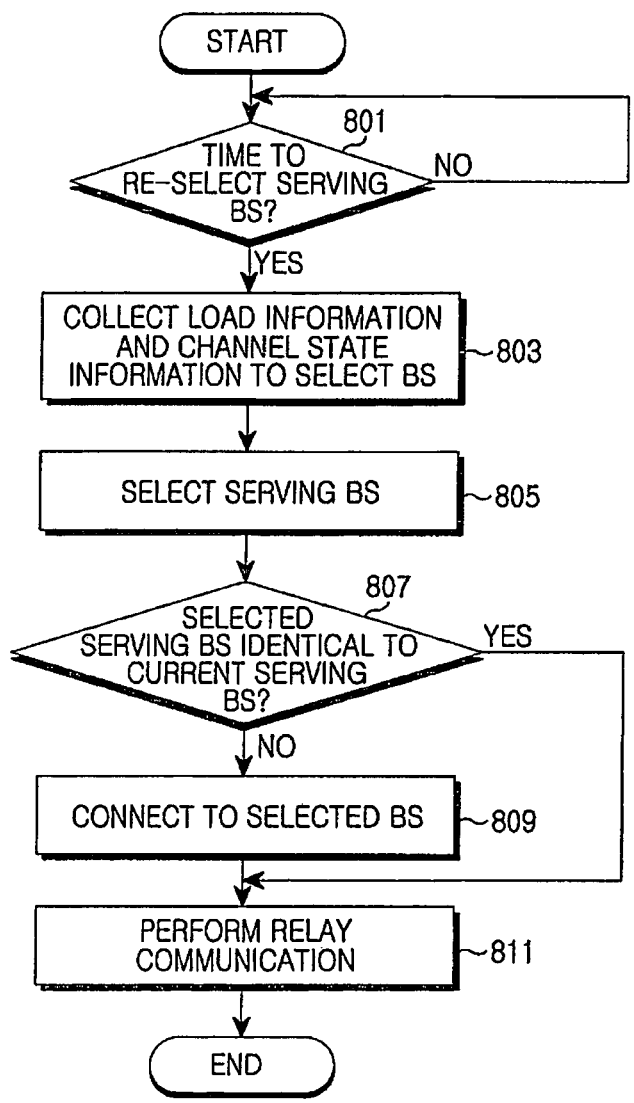
FIG. 8 is a flowchart of a relay communication procedure of an RS in a relay broadband wireless communication system according to an embodiment of the present invention.

FIG. 8 is a flowchart of a relay communication procedure of an RS in a relay broadband wireless communication system according to an embodiment of the present invention.

Referring to FIG. 8, in step 801, the RS detects whether it is the time to re-select a serving BS. The time to re-select the serving BS may vary according to an operating policy of a system. For example, the time to re-select the serving BS may be determined according to a predetermined period or may be set to the time when the channel state with a current serving BS, which is currently in communication with the RS, is degraded or when load of the current serving BS exceeds a threshold value.

If it is the time to re-select the serving BS, the RS proceeds to step 803 to collect channel-state information and load information for selecting a serving BS. That is, the RS detects the load information of each BS received from each BS, and measures the channel state by using a pilot and a preamble received from each BS.

After the load information and the channel-state information are collected, the RS proceeds to step 805 to select a serving BS in due consideration of the load information, the channel state information, the required amount of resources and the like. One or more base stations may be selected as a serving BS. The simplest example of selecting the serving BS may include selecting a BS having the most available resources, i.e., a BS with the smallest load. The selecting of the serving BS may be performed in various manners in combination of the load information, the channel-state information, the required resource amount, and the like.

After selecting the serving BS, the RS proceeds to step 807 to check whether the serving BS selected in step 805 is identical to the current BS which is currently in communication. If a plurality of serving base stations are selected, the plurality of serving base stations must be identical.

If the selected serving BS is not identical to the current BS, the RS proceeds to step 809 to connect to the selected serving BS. If the current serving BS and the selected serving BS are identical, the RS proceeds to step 811.

In step 811, the RS performs relay communication through the connecting serving BS. The RS may use a beamforming or beamstirring technique to attenuate mutual interference with base stations that are not selected. Alternatively, the RS may perform communication through a macro MIMO channel formed with channels of a plurality of base stations.

Figure 9:
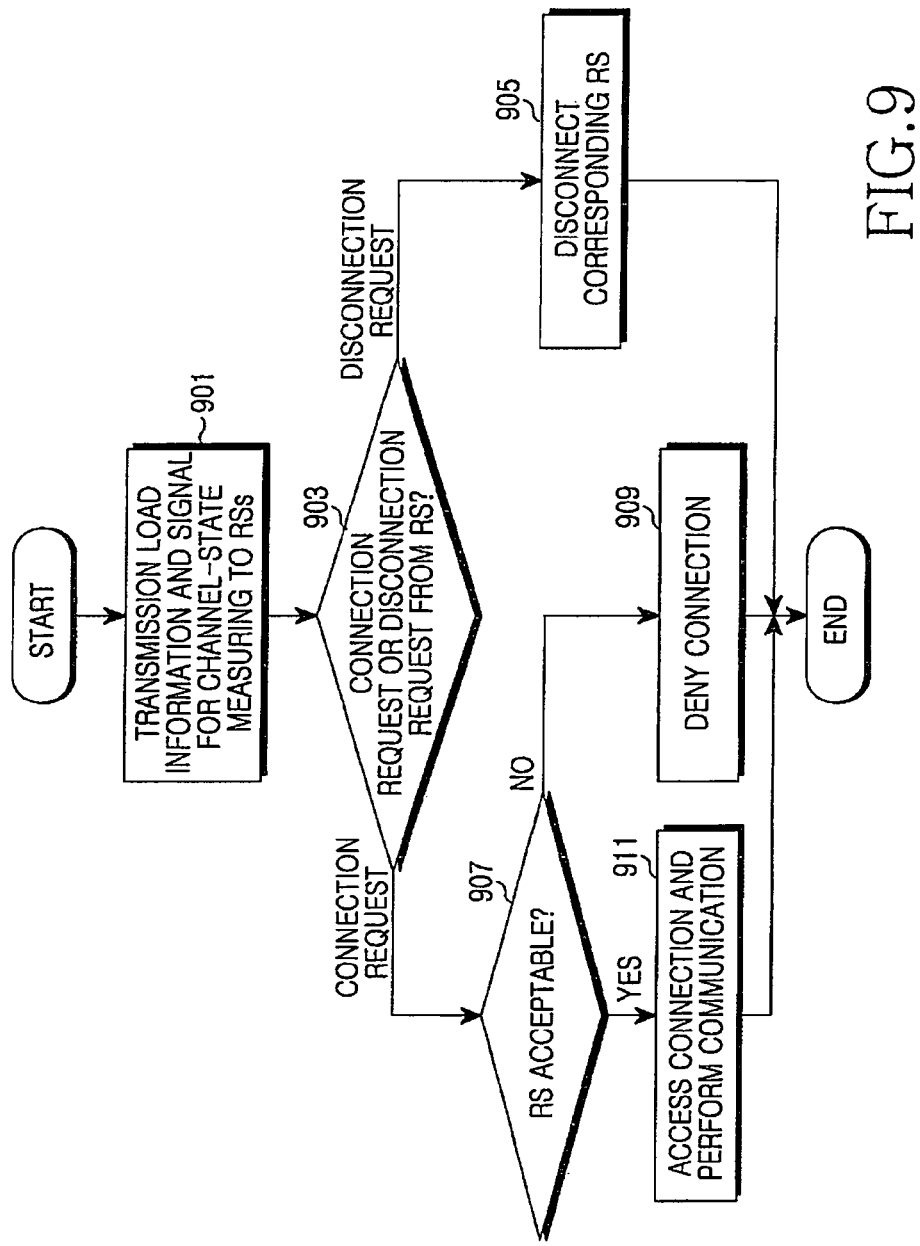
FIG. 9 is a flowchart of a relay communication procedure of a BS in a relay broadband wireless communication system according to an embodiment of the present invention.

FIG. 9 is a flowchart of a relay communication procedure of a BS in a relay broadband wireless communication system according to an embodiment of the present invention.

Referring to FIG. 9, in step 911, the BS transmits load information thereof and a pilot and preamble signal for measuring of a channel-state to an RS. The load information is transmitted periodically or non-periodically through a separate control channel. The pilot and preamble signal is also periodically or non-periodically transmitted.

Thereafter, the BS proceeds to step 903 to detect whether a connection request or a disconnection request is generated from an RS. The connection request is generated from an RS that is not in communication, and the disconnection request is generated from an RS that is in communication.

If the disconnection request is generated, the BS proceeds to step 905 to disconnect with the RS.

In contrast, if the connection request is generated, the BS proceeds to step 907 to determine whether the RS can be accepted. The acceptance of the RS is determined by referencing available resources, a load state, and so on.

If the RS is not acceptable, the BS proceeds to step 909 to deny the connection request of the RS.

If the corresponding RS is acceptable, the BS proceeds to step 911 to accept the connection of an MS and perform relay communication with the RS. If the RS selects a plurality of serving base stations, the BS may form a macro MIMO channel with the RS to perform communication. The control for forming the macro MIMO channel may be performed by coordination of an upper node of the BS or through signaling between the base stations.

As described above, the RS selects an optimum serving BS in the relay broadband wireless communication system according to the present invention, so that overhead caused by multi-hop transmission is reduced, and the relay service may be provided even with a small number of relay stations. Also, since the RS changes a serving BS according to a state of the BS, a load-standardizing effect of load between cells is achieved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A relay wireless communication system comprising:
   a plurality of base stations configured to perform communication with a relay station and generate state information to be provided to the relay station; and the relay station disposed at a location common to a coverage area of each of the plurality of base stations and configured to select one or more serving base stations based on state information received from each of the base stations.

2. The relay wireless communication system of claim 1, wherein the state information comprises a load state of the base station.

3. The relay wireless communication system of claim 2, wherein the relay station selects the one or more serving base stations based on at least one of a load state of each base station, a channel state with each base station and a required amount of resources.

4. The relay wireless communication system of claim 2, wherein the relay station re-selects the one or more serving base stations periodically.

5. The relay wireless communication system of claim 1, wherein the relay station performs beamforming in which a main beam is directed to the one or more serving base stations.

6. The relay wireless communication system of claim 1, wherein the relay station performs communication according to a multiple input multiple output (MIMO) technique through a macro MIMO channel formed with respective channels of at least two of the serving base stations.

7. A relay station in a relay wireless communication system comprising:
 a management unit configured to store state information of a plurality of base stations that are communicable;
 a selection unit configured to select one or more serving base stations based on the state information; and
 a communication unit configured to transmit and receive a signal with the one or more serving base stations,
 wherein the relay station is disposed at a location common to a coverage area of each of the plurality of base stations.

8. The relay station of claim 7, wherein the management unit stores at least one of load state information and channel state information of each base station.

9. The relay station of claim 8, wherein the selection unit selects one or more serving base stations based on at least one of the load state information, the channel state information and the required amount of resources.

10. The relay station of claim 9, wherein the selection unit selects the one or more serving base stations in ascending order of load.

11. The relay station of claim 8, further comprising a detector detecting a load state of each base station by using control information being received, and providing the detected load state information to the management unit.

12. The relay station of claim 8, further comprising a measurement unit measuring a channel state with each base station by using a reception signal and providing the channel state information to the management unit.

13. The relay station of claim 7, further comprising a beamforming unit performing beamstiring or beamforming in which a main beam is directed to the one or more serving base stations.

14. The relay station of claim 7, further comprising a processing unit processing a signal according to a multiple input multiple output (MIMO) technique, the signal being received/transmitted through a macro MIMO channel comprising respective channels of at least two of the serving base stations.

15. A base station in a relay wireless communication system comprising:
 a generation unit configured to generate state information of a base station to select a serving base station of a relay station disposed at a location common to a coverage area of each of a plurality of base stations;
 a communication unit configured to transmit the state information to the relay station; and
 a control unit configured to determine whether to accept connection when a connection request is generated from the relay station,
 wherein the control unit provides control to perform communication according to a multiple input multiple output (MIMO) technique by forming a macro MIMO channel with respect to a relay station selecting a plurality of base stations as serving base stations, the macro MIMO channel being formed with a channel of the base station and a channel of at least one of the other base stations.

16. The base station of claim 15, wherein the state information comprises load state information of the base station.

17. The base station of claim 15, wherein the control unit determines whether to accept the connection based on at least one of the amount of available resources and a channel state with the relay station.

18. A method for operating a relay station in a relay wireless communication system, the method comprising:
 receiving, at the relay station, state information of a plurality of base stations being communicable;
 selecting, by the relay station, one or more serving base stations based on the state information; and
 performing, by the relay station, communication with the one or more serving base stations,
 wherein the relay station is disposed at a location common to a coverage area of each of the plurality of base stations.

19. The method of claim 18, wherein the state information comprises load state information of each base station.

20. The method of claim 19, wherein the selecting of the one or more serving base stations comprises selecting the one or more serving base stations based on at least one of load state information of each base station, channel state information of each base station and the required amount of resources.

21. The method of claim 20, wherein the selecting of the one or more serving base stations comprises selecting the one or more serving base stations in ascending order of load.

22. The method of claim 18, wherein the performing of the communication comprises performing beamstiring or beamforming in which a main beam is directed to the one or more serving base stations.

23. The method of claim 18, wherein the performing of the communication comprises processing a signal according to a multiple input multiple output (MIMO) technique, the signal being transmitted/received through a macro MIMO channel formed with respective channels of at least two of the serving base stations.

24. A method for operating a base station in a relay wireless communication system, the method comprising:
 transmitting, by the base station, state information of the base station to a relay station shared by a plurality of base stations to cause the relay station to select a serving base station;
 determining, by the base station, whether to accept connection when a connection request is generated from the relay station; and
 performing, by the base station, communication with the relay station when the connection is accepted,
 wherein the performing of the communication comprises performing communication according to a multiple input multiple output (MIMO) technique by forming a macro MIMO channel with respect to the relay station selecting a plurality of base stations as serving base stations, the macro MIMI channel being formed with a channel of the base station and a channel of at least one of other base stations.

25. The method of claim 24, wherein the state information includes load state information of the base station.

26. The method of claim 24, wherein whether to accept the connection is determined based on the amount of available resources and a channel state with the relay station.

* * * * *